United States Patent [19]

Miwa

[11] Patent Number: 5,811,361
[45] Date of Patent: Sep. 22, 1998

[54] ALKALI-FREE GLASS SUBSTRATE

[75] Inventor: Shinkichi Miwa, Nishinomiya, Japan

[73] Assignee: Nippon Electric Glass Co., Ltd., Otsu, Japan

[21] Appl. No.: 849,044

[22] PCT Filed: Sep. 25, 1996

[86] PCT No.: PCT/JP96/02750

§ 371 Date: May 23, 1997

§ 102(e) Date: May 23, 1997

[87] PCT Pub. No.: WO97/11919

PCT Pub. Date: Apr. 3, 1997

[30] Foreign Application Priority Data

Sep. 28, 1995 [JP] Japan ..................... 7-276759

[51] Int. Cl.$^6$ ............ C03C 3/078; C03C 3/087; C03C 3/093; C03C 3/085
[52] U.S. Cl. ............... 501/70; 501/66; 501/67; 501/69
[58] Field of Search ................ 501/66, 67, 69, 501/70, 72

[56] References Cited

U.S. PATENT DOCUMENTS

| | | | |
|---|---|---|---|
| 3,496,401 | 2/1970 | Dumbaugh, Jr. | 501/70 |
| 5,244,847 | 9/1993 | Kushitani et al. | 501/70 |
| 5,489,558 | 2/1996 | Moffatt et al. | 501/66 |

FOREIGN PATENT DOCUMENTS

| | | |
|---|---|---|
| 61-281041 | 12/1986 | Japan . |
| 2133334-A | 5/1990 | Japan . |
| 4-175242 | 6/1992 | Japan . |
| 4-325436 | 11/1992 | Japan . |

*Primary Examiner*—Michael Marcheschi
*Attorney, Agent, or Firm*—Collard & Roe, P.C.

[57] ABSTRACT

In order to provide an alkali-free glass substrate which contains substantially no alkali metal oxide, which has chemical resistance, a high strain point, and excellent meltability and formability, and which has a density of 2.6 g/cm$^3$ or less, the alkali-free glass substrate contains substantially no alkali metal oxide and essentially consists, by weight, of 50.0–57.9% $SiO_2$, 10.0–25.0% $Al_2O_3$, 3.0–12.0% $B_2O_3$, 0–2.0% MgO, 0–10.0% CaO, 0.1–5.0% BaO, 0.1–15.0% SrO, 0–5.0% ZnO, 0–5.0% $ZrO_2$, and 0–5.0% $TiO_2$.

1 Claim, No Drawings

ALKALI-FREE GLASS SUBSTRATE

CROSS-REFERENCE TO RELATED APPLICATION

This application is a 371 of international application No. PCT/JP96/02750, filed Sep. 25, 1996.

BACKGROUND OF THE INVENTION

1. Field of the Invention

This invention relates to an alkali-free glass substrate for use as a substrate for a display such as a liquid crystal display and an EL display, a filter, a sensor, and the like.

2. Description of the Prior Art

Conventionally, a glass substrate has widely been used as a substrate for a flat panel display such as a liquid crystal display, a filter, a sensor, and the like.

On a surface of the glass substrate of the type, a transparent conductive film, an insulating film, a semiconductor film, and a metal film are deposited and various circuits or patterns are formed by photolithography etching (photo etching). In such deposition and photo etching processes, the glass substrate is subjected to various kinds of heat treatment and chemical treatment.

For example, in case of an active matrix liquid crystal display of a thin-film-transistor (TFT) type, the insulating film and the transparent conductive film are deposited on the glass substrate and a number of TFTs of amorphous silicon or polycrystalline silicon are formed by the photo etching. In these processes, the glass substrate is subjected to the heat treatment at a temperature on the order of several hundreds degrees centigrate and to the chemical treatment by various chemicals such as sulfuric acid, hydrochloric acid, alkali solution, hydrofluoric acid, and buffered hydrofluoric acid.

Among others, buffered hydrofluoric acid is widely used in etching of the insulating film. The buffered hydrofluoric acid tends to erode a glass so that its surface is clouded. During the erosion, reaction with a glass component occurs and produces a reaction product, which may clog a mesh or pores of filtration screens used in the process or adhere onto the glass substrate. On the other hand, hydrochloric acid is used in etching of an ITO film and a chromium film. The hydrochloric acid also tends to erode the glass so that its surface suffers discoloration, cloudiness, and cracks. It is very important to provide buffered-hydrofluoric-acid resistance and hydrochloric-acid resistance to the glass substrate of the type.

Therefore, the glass substrate for use in the active matrix liquid crystal display of a TFT type is required to have following characteristics.

(1) To contain substantially no alkali metal oxide because, if alkali metal oxide is contained in the glass, alkali ion is diffused in a deposited semiconductor material during heat treatment to result in degradation of a film characteristic.

(2) To have chemical resistance such that no degradation is caused by chemicals including various kinds of acid and alkali used in a photo etching process.

(3) To cause no heat contraction by heat treatment in a deposition or an annealing process. For this purpose, to have a high strain point. For example, in case of a polycrystalline silicon TFT-LCD requiring a working temperature of about 600° C. or more, the glass substrate for such application must have a strain point of 650° C. or more.

Taking the meltability and the formability into consideration, the glass substrate of the type is further required to have following characteristics.

(4) To be excellent in meltability so that a melting defect unfavorable as the glass substrate does not occur in the glass.

(5) To be excellent in devitrification resistance so that no foreign substance is produced in the glass during melting or forming.

In recent years, an electronic device such as the active matrix liquid crystal display of a TFT type is coming into use in a field of personal application and is therefore required to be light in weight. Consequently, the glass substrate is also required to be light in weight so that reduction in thickness is pursued. On the other hand, the electronic device of the type is also increased in size. Under the circumstances, the reduction in thickness is inevitably limited, taking the strength of the glass into consideration. Therefore, it is required to reduce the density of the glass in order to make the glass substrate light in weight.

As the substrate for the active matrix liquid crystal display of a TFT type, use has traditionally been made of alkali-free glass materials, such as quarz glass, barium borosilicate glass, and aluminosilicate glass, each of which has both advantages and disadvantages, however.

Specifically, the quarz glass is excellent in chemical resistance and heat resistance and has a low density. However, the quarz glass requires a high material cost.

As the barium borosilicate glass, there is a commercially-available product #7059 supplied by Corning. However, this glass is inferior in acid resistance so that transformation, cloudness, and roughness are easily caused on the surface of the glass substrate. In addition, an eluting component from the substrate tends to contaminate a chemical solution. Furthermore, this glass has a low strain point and is readily subjected to heat contraction and heat deformation. Thus, heat resistance is insufficient. The density of the glass is as high as 2.76 g/cm$^3$.

On the other hand, the aluminosilicate glass is excellent in heat resistance. However, most of commercially-available glass substrates are inferior in meltability and unsuitable for mass production. In addition, most of these glass substrates have a high density of 2.7 g/cm$^3$ or more, and are inferior in buffered-hydrofluoric-acid resistance. At present, there is no glass substrate satisfying all of the required characteristics.

SUMMARY OF THE INVENTION

Accordingly, it is an object of the present invention to provide an alkali-free glass substrate which satisfies all of the above-mentioned required characteristics (1) to (5) and which has a density of 2.6 g/cm$^3$ or less.

An alkali-free glass substrate according to the present invention essentially consists, by weight, of 50.0–57.9% $SiO_2$, 10.0–25.0% $Al_2O_3$, 3.0–12.0% $B_2O_3$, 0–2.0% MgO, 0–10.0% CaO, 0.1–5.0% BaO, 0.1–15.0% SrO, 0–5.0% ZnO, 0–5.0% $ZrO_2$, and 0–5.0% $TiO_2$, and contains substantially no alkali metal oxide.

At first, description will be made about the reason why the components of the alkali-free glass substrate of this invention are defined as mentioned above.

$SiO_2$ is a component serving as a network former of the glass. The content of $SiO_2$ is 50.0–57.9%. When the content is less than 50.0%, chemical resistance, more particularly, acid resistance is degraded. In addition, a strain point is lowered so that heat resistance is degraded. Furthermore, the density becomes high. When the content is more than 57.9%, the tendency of devitrification is increased so that a devitrified foreign substance of cristobalite may precipitate in the glass.

$Al_2O_3$ is an essential component required to improve the heat resistance and devitrification resistance of the glass and to lower the density. The content of $Al_2O_3$ is 10.0–25.0%. When the content is less than 10.0%, the tendency of devitrification is increased so that the devitrified foreign substance of cristobalite may precipitate in the glass. In addition, the strain point becomes low. When the content is more than 25.0%, buffered-hydrofluoric-acid resistance is degraded so that the cloudness is readily caused to occur on the surface of the glass substrate. Besides, the high-temperature viscosity of the glass is increased and the meltability is deteriorated.

$B_2O_3$ is a component serving as a melting agent to lower the viscosity and to improve the meltability. The content of $B_2O_3$ is 3.0–12.0%, preferably, 6.5–12.0%, and more preferably, 8.5–12.0%. When the content is less than 3.0%, the function as the melting agent is insufficient and the buffered-hydrofluoric-acid resistance is degraded. When the content is more than 12.0%, the strain point of the glass is lowered so that the heat resistance is degraded. In addition, the acid resistance is also degraded.

MgO has a function of decreasing the high-temperature viscosity without lowering the strain point so as to improve the meltability of the glass. Furthermore, MgO is a component which has a greatest effect of reducing the density among bivalent alkaline earth metal oxides. However, a large content is unfavorable because the tendency of devitrification is increased. Therefore, the content of MgO is 0–2.0%, preferably, 0–1.0%.

Like MgO, CaO is a component having a function of decreasing the high-temperature viscosity without lowering the strain point so as to improve the meltability of the glass. The content of CaO is 0–10.0%, preferably, 1.8–7.5%, more preferably, 2.1–7.5%. The content more than 10.0% is unfavorable because the buffered-hydrofluoric-acid resistance of the glass is seriously degraded. Specifically, when the glass is subjected to buffered hydrofluoric acid treatment, a large amount of a reaction product by a CaO component in the glass and the buffered hydrofluoric acid precipitates on the surface of the glass so that the glass substrate is readily clouded. In addition, those elements formed on the glass substrate and the chemical solution may often be contaminated by the reaction product.

BaO is a component to improve the chemical resistance and the devitrification resistance of the glass. The content of BaO is 0.1–5.0%, preferably, 0.1–4.5%. When the content is less than 0.1%, it is difficult to obtain the above-described effect. The content more than 5.0% is unfavorable because the density of the glass is increased.

Like BaO, SrO is a component to enhance the chemical resistance of the glass and to improve the devitrification resistance. Furthermore, SrO has a characteristic such that the meltability is hardly deteriorated, in comparison with BaO. The content of SrO is 0.1–15.0%, preferably, 3.5–15.0%, more preferably, 5.0–15.0%. When the content is less than 0.1%, it is difficult to obtain the above-described effect. On the other hand, the content more than 15.0% is unfavorable because the density of the glass is increased.

ZnO is a component to improve the buffered-hydrofluoric-acid resistance and to improve the meltability. The content of ZnO is 0–5.0%. When the content is more than 5.0%, the glass tends to be devitrified. In addition, the strain point is lowered so that excellent heat resistance can not be achieved.

It is noted here that, when the total content of MgO, CaO, SrO, BaO, and ZnO is less than 5.0%, the viscosity at a high temperature is increased so that the meltability is degraded and the glass is readily devitrified. On the other hand, the total content more than 20.0% is unfavorable because the density of the glass is increased.

$ZrO_2$ is a component to improve the chemical resistance, particularly, the heat resistance of the glass and to improve the meltability by reducing the high-temperature viscosity. The content of $ZrO_2$ is 0–5.0%, preferably, 0.1–4%. When the content is more than 5.0%, the devitrification temperature rises so that the devitrified substance of zircon readily precipitates.

$TiO_2$ is also a component to improve the chemical resistance, particularly, the acid resistance. In addition, $TiO_2$ is a component to lower the high-temperature viscosity so as to improve the meltability, and to avoid coloring by ultraviolet rays. Specifically, when a liquid crystal display is manufactured, the ultraviolet rays are sometimes irradiated in order to remove an organic substance on the glass substrate. However, coloring of the glass substrate by the ultra-violet rays is unfavorable because the transmittance is degraded. Therefore, the glass substrate of the type is required not to be colored by the ultraviolet rays. However, the content of $TiO_2$ more than 5.0% is unfavorable because the glass tends to be colored. In the present invention, it is possible to add other components than the above-described ones as far as the characteristics are not deteriorated. For example, it is possible to add as a clarifying agent those components such as $As_2O_3$, $Sb_2O_3$, $F_2$ $Cl_2$, $SO_3$, and $SnO_2$ as well as metal powder such as Al and Si.

However, it is unfavorable that alkali metal oxide is contained in the glass because the characteristics of various films or semiconductor elements formed on the glass substrate are deteriorated. PbO typically used as the melting agent seriously degrades the chemical resistance of the glass. In addition, PbO is unfavorable because it may volatilize from the surface of the melt during melting to cause environmental pollution.

$P_2O_5$, which is generally used as the melting agent, is unfavorable because the glass is phase-separated and the chemical resistance is seriously degraded. When CuO is contained, the glass is colored and can not be used as a glass substrate for a display.

Now, the alkali-free glass substrate according to the present invention will be described in detail in conjunction with specific examples.

DESCRIPTION OF THE PREFERRED EMBODIMENTS

Tables 1 to 3 show glass samples (samples Nos. 1–12) according to the present invention and comparative glass samples (samples Nos. 13–18).

Each of the samples shown in Tables was prepared as follows. At first, a glass material was prepared to have a composition shown in Tables. The glass material was put in a platinum crucible and melted at 1580° C. for 24 hours. Thereafter, the glass melt was poured on a carbon plate and formed into a plate shape.

As is obvious from Tables, each of the samples Nos. 1–12 of the present invention had a density of 2.60 g/cm$^3$ or less and a strain point of 665° C. or more. The samples Nos. 1–12 were excellent in hydrochloric-acid resistance, buffered-hydrofluoric-acid resistance, and devitrification resistance. Furthermore, in each of the samples Nos. 1–12, the temperature corresponding to $10^{2.5}$ poises was 1569° C. or less. Thus, each of these samples exhibited an excellent characteristic.

On the other hand, the comparative sample No. 13 had a high density and was inferior in devitrification resistance. The sample No. 14 was also inferior in devitrification resistance. The sample No. 15 had a low strain point and was inferior in devitrification resistance. The sample No. 16 was inferior in the hydrochloric-acid resistance, buffered-hydrofluoric-acid resistance, and devitrification resistance.

TABLE 1

(wt %)

| Composition | This Invention Sample No. | | | | | | | |
|---|---|---|---|---|---|---|---|---|
|  | 1 | 2 | 3 | 4 | 5 | 6 | 7 | 8 |
| SiO$_2$ | 57.5 | 56.5 | 54.5 | 56.9 | 57.5 | 56.0 | 53.0 | 55.0 |
| Al$_2$O$_3$ | 16.0 | 18.0 | 22.0 | 16.5 | 17.5 | 14.0 | 20.0 | 21.0 |
| B$_2$O$_3$ | 9.0 | 8.0 | 5.5 | 10.5 | 9.5 | 10.0 | 11.0 | 7.0 |
| MgO | — | — | 0.5 | 0.5 | — | — | — | 0.5 |
| CaO | 6.5 | 2.5 | 3.0 | 2.1 | 5.0 | 8.0 | 3.0 | 3.5 |
| BaO | 2.0 | 3.0 | 4.0 | 3.5 | 2.0 | 1.0 | 2.5 | 0.5 |
| SrO | 6.0 | 8.0 | 5.5 | 6.5 | 8.0 | 7.0 | 10.5 | 12.0 |
| ZnO | 1.0 | 2.0 | 2.5 | 1.5 | 0.5 | — | — | 0.5 |
| ZrO$_2$ | 1.0 | — | 1.5 | 1.0 | — | 2.0 | — | — |
| TiO$_2$ | 1.0 | 2.0 | 1.0 | 1.0 | — | 2.0 | — | — |
| Density (g/cm$^3$) | 2.55 | 2.57 | 2.59 | 2.56 | 2.55 | 2.58 | 2.57 | 2.60 |
| Strain Point (°C.) | 674 | 679 | 714 | 667 | 677 | 665 | 674 | 701 |
| Hydrochloric-acid Resistance | ○ | ○ | ○ | ○ | ○ | ○ | ○ | ○ |
| Buffered-hydrofluoric-acid Resistance | ○ | ○ | ○ | ○ | ○ | ○ | ○ | ○ |
| Devitrification Resistance | ○ | ○ | ○ | ○ | ○ | ○ | ○ | ○ |
| 10$^{2.5}$ Poise Temperature (°C.) | 1501 | 1554 | 1569 | 1545 | 1546 | 1432 | 1532 | 1549 |

TABLE 2

(wt %)

| Composition | This Invention Sample No. | | | |
|---|---|---|---|---|
|  | 9 | 10 | 11 | 12 |
| SiO$_2$ | 57.5 | 57.0 | 53.0 | 57.5 |
| Al$_2$O$_3$ | 16.0 | 15.0 | 19.0 | 17.5 |
| B$_2$O$_3$ | 10.5 | 11.5 | 12.0 | 9.5 |
| MgO | 0.3 | — | — | — |
| CaO | 6.2 | 6.5 | 3.0 | 5.0 |
| BaO | 3.0 | 3.0 | 2.5 | 2.0 |
| SrO | 6.0 | 6.5 | 10.0 | 7.0 |
| ZnO | — | — | — | 0.5 |
| ZrO$_2$ | 0.5 | 0.5 | 0.5 | 1.0 |
| TiO$_2$ | — | — | — | — |
| Density (g/cm$^3$) | 2.55 | 2.56 | 2.57 | 2.56 |
| Strain Point (°C.) | 666 | 665 | 668 | 683 |
| Hydrochloric-acid Resistance | ○ | ○ | ○ | ○ |
| Buffered-hydrofluoric-acid Resistance | ○ | ○ | ○ | ○ |
| Devitrification Resistance | ○ | ○ | ○ | ○ |
| 10$^{2.5}$ Poise Temperature (°C.) | 1504 | 1550 | 1519 | 1547 |

TABLE 3

(wt %)

| Composition | Comparative Example Sample No. | | | | | |
|---|---|---|---|---|---|---|
|  | 13 | 14 | 15 | 16 | 17 | 18 |
| SiO$_2$ | 60.0 | 59.0 | 63.0 | 57.0 | 55.0 | 49.0 |
| Al$_2$O$_3$ | 12.0 | 14.5 | 9.0 | 21.5 | 19.0 | 16.0 |
| B$_2$O$_3$ | 7.5 | 10.0 | 11.0 | 8.0 | 5.0 | 13.0 |
| MgO | — | 4.0 | — | 2.0 | 0.5 | 1.0 |
| CaO | 6.0 | 5.5 | 4.5 | 8.0 | 11.0 | 5.0 |
| BaO | 11.0 | 5.0 | 1.0 | 3.0 | 7.0 | 6.0 |
| SrO | 3.5 | 2.0 | 11.5 | — | 1.0 | 8.0 |
| ZnO | — | — | — | — | 1.5 | 2.0 |
| ZrO$_2$ | — | — | — | — | — | — |
| TiO$_2$ | — | — | — | — | — | — |
| Density (g/cm$^3$) | 2.69 | 2.55 | 2.56 | 2.48 | 2.65 | 2.65 |
| Strain Point (°C.) | 650 | 650 | 608 | 679 | 704 | 627 |
| Hydrochloric-acid Resistance | ○ | ○ | ○ | X | ○ | X |
| Buffered-hydrofluoric-acid Resistance | ○ | ○ | ○ | X | Δ | ○ |
| Devitrification Resistance | X | X | X | X | ○ | ○ |
| 10$^{2.5}$ Poise Temperature (°C.) | 1582 | 1570 | 1570 | 1542 | 1367 | 1584 |

The sample No. 17 had a high density and was slightly inferior in buffered-hydrofluoric-acid resistance. The sample No. 18 had a high density and a low strain point, and was inferior in hydrochloric-acid resistance.

The density in Tables was measured by a well known Archimedes' method. The strain point was measured based on the ASTM C336-71 method.

The hydrochloric-acid resistance was evaluated by observing the surface condition of the glass substrate after each sample was optically polished and immersed in a 10 wt % hydrochloric acid solution held at 80° C. for 24 hours. The buffered-hydrofluoric-acid resistance was evaluated by observing the surface condition of the glass substrate after each sample was optically polished and immersed in a buffered hydrofluoric acid solution comprising 38.7 wt % ammonium fluoride and 1.6 wt % hydrofluoric acid held at 20° C. for 30 minutes. The symbols, x, Δ, and ○ represent presence of cloudness or cracks on the surface of the glass substrate, presence of a little cloudness, and no change, respectively.

The devitrification resistance was evaluated by preparing, from each sample, glass powder having a particle size of 300–500 μm, putting the glass powder into a platinum boat for heat treatment at 1100° C. for 100 hours, and observing devitrification. The symbols x and ○ represent presence of even a little devitrification and no devitrification at all, respectively.

10$^{2.5}$ poise temperature represents the temperature corresponding to 10$^{2.5}$ poises as the high-temperature viscosity. The lower this temperature is, the more excellent the melting formability is.

As described above, according to the present invention, there is provided the alkali-free glass substrate which contains substantially no alkali metal oxide, which is excellent in heat resistance, chemical resistance, and melting formability, and which has a low density of 2.6 g/cm$^3$ or less.

Industrial Applicability

As described above, the alkali-free glass substrate according to the present invention can be used as a substrate for a display such as a liquid crystal display and an EL display, a filter, a sensor, and the like, and is particularly suitable as a glass substrate for use in a TFT-type active matrix liquid crystal display required to be light in weight.

I claim:

1. An alkali-free glass substrate consisting essentially of, by weight, 50.0–57.9% $SiO_2$, 10.0–25.0% $Al_2O_3$, 3.0–12.0% $B_2O_3$, 0–2.0% MgO, 0–10.0% CaO, 0.1–5.0% BaO, 0.1–15.0% SrO, 0–5.0% ZnO, 5.0–20.0% MgO+CaO+SrO+BaO+ZnO, 0–5.0% $ZrO_2$, and 0–5.0% $TiO_2$, said substrate being essentially free of alkali metal oxide and having a density not exceeding 2.6 $g/cm^3$, and a chemical resistance so that the glass surface does not change after the glass is immersed for 30 minutes in a buffered hydrofluoric acid solution held at 20° C., said buffered hydrofluoric acid solution comprising, by weight, 38.7% ammonium fluoride and 1.6% hydrofluoric acid.

* * * * *